(12) United States Patent
Pollitt (10) Patent No.: US 11,635,110 B2
(45) Date of Patent: Apr. 25, 2023

(54) COMPOSITE FLEXIBLE COUPLING

(71) Applicant: Crompton Technology Group Limited, Solihull (GB)

(72) Inventor: Will Pollitt, Kenilworth (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 1232 days.

(21) Appl. No.: 16/157,137

(22) Filed: Oct. 11, 2018

(65) Prior Publication Data

US 2019/0128334 A1    May 2, 2019

(30) Foreign Application Priority Data

Oct. 30, 2017    (EP) .................................... 17199271

(51) Int. Cl.
  *F16D 3/00*    (2006.01)
  *B29C 53/00*    (2006.01)
  (Continued)

(52) U.S. Cl.
  CPC ............ *F16D 3/005* (2013.01); *B29C 53/587* (2013.01); *B29C 53/60* (2013.01); *B29C 63/0004* (2013.01); *B29C 63/0073* (2013.01); *B29C 70/30* (2013.01); *B29C 70/545* (2013.01); *B32B 1/00* (2013.01); *B32B 5/024* (2013.01);
  (Continued)

(58) Field of Classification Search
  CPC ... F16D 3/00; F16D 3/005; F16D 3/70; F16D 3/72; F16D 3/725; B29C 53/00; B29C 53/50; B29C 53/58; B29C 53/587; B29C 53/60; B29C 63/00; B29C 63/0004; B29C 63/007; B29C 63/0073; B29C 70/00; B29C 70/30; B29C 70/50; B29C 70/54; B29C 70/545; B32B 1/00; B32B 5/00; B32B 5/02; B32B 5/024; B32B 5/20; B32B 5/26; B32B 37/00; B32B 37/10; B32B 37/18; B32B 37/182; B32B 38/00; B32B 38/10; B32B 38/18; B32B 38/1808
  See application file for complete search history.

(56) References Cited

U.S. PATENT DOCUMENTS 3,390,546 A    7/1968 Jewell
4,853,060 A *  8/1989 Nickel .................... F16D 3/387
                                                156/172

(Continued)

OTHER PUBLICATIONS

Extended European Search Report for International Application No. 17199271.2 dated Apr. 18, 2018, 7 pages.

(Continued)

*Primary Examiner* — Jacob T Minskey
*Assistant Examiner* — Matthew Hoover
(74) *Attorney, Agent, or Firm* — Cantor Colburn LLP (57) ABSTRACT

A flexible coupling for transmitting torque between parts of a transmission shaft system comprises a tubular section of continuous-fibre-reinforced composite material which has been modified to form a living hinge section with reduced bending stiffness to allow flexion of the tubular section. The tubular section may be modified through the provision of a pattern of formations within the living hinge section. The formations may be in the form of apertures and/or recesses in the continuous-fibre-reinforced composite material to create a plurality of living hinges in the material between, in particular slots and/or grooves.

9 Claims, 9 Drawing Sheets

(51) Int. Cl.
　　　B29C 63/00　　(2006.01)
　　　B29C 70/00　　(2006.01)
　　　B32B 1/00　　(2006.01)
　　　B32B 5/00　　(2006.01)
　　　B32B 37/00　　(2006.01)
　　　B32B 38/00　　(2006.01)
　　　F16D 3/72　　(2006.01)
　　　B32B 5/02　　(2006.01)
　　　B32B 37/18　　(2006.01)
　　　B32B 38/18　　(2006.01)
　　　B29C 70/30　　(2006.01)
　　　B32B 5/26　　(2006.01)
　　　B29C 70/54　　(2006.01)
　　　B29C 53/58　　(2006.01)
　　　B29C 53/60　　(2006.01)
　　　B29L 31/24　　(2006.01)
(52) U.S. Cl.
　　　CPC .............. *B32B 5/26* (2013.01); *B32B 37/182* (2013.01); *B32B 38/1808* (2013.01); *F16D 3/72* (2013.01); *F16D 3/725* (2013.01); *B29L 2031/24* (2013.01); *B32B 2260/023* (2013.01); *B32B 2260/046* (2013.01); *B32B 2305/07* (2013.01); *B32B 2305/188* (2013.01); *B32B 2305/72* (2013.01); *B32B 2307/546* (2013.01)

(56) References Cited

U.S. PATENT DOCUMENTS

| | | |
|---|---|---|
| 5,041,060 A | 8/1991 | Hendershot |
| 5,315,996 A | 5/1994 | Lundquist |
| 5,928,736 A * | 7/1999 | Parekh .................. B29C 53/587 |
| | | 428/36.1 |
| 6,013,341 A | 1/2000 | Medvedev et al. |
| 6,374,565 B1 | 4/2002 | Warren |
| 7,140,398 B2 | 11/2006 | Dodge et al. |
| 9,144,665 B2 | 9/2015 | Salstrom et al. |
| 2012/0296168 A1 | 11/2012 | Horne, Jr. |
| 2017/0159699 A1* | 6/2017 | Barnes ...................... F16C 1/02 |

OTHER PUBLICATIONS

Brazilian Office Action for application BR 102018068954-1, with translation, dated Jul. 7, 2022, 6 pages.

* cited by examiner

COMPOSITE FLEXIBLE COUPLING

FOREIGN PRIORITY

This application claims priority to European Patent Application No. 17199271.2 filed Oct. 30, 2017, the entire contents of which is incorporated herein by reference.

FIELD

The present disclosure relates to a flexible coupling. It may be used for transmitting torque between parts of a transmission shaft system. The present disclosure also relates to a method of making a flexible coupling for transmitting torque between parts of a transmission shaft system.

BACKGROUND

In many vehicles it is desirable to accommodate axial misalignment between sections of a transmission shaft system. Common solutions for allowing for misalignment are universal joints, crowned spline joints or disc type couplings. Further, it is known to provide a metal flexible coupling in the form of a metal tube which connects two shafts together. The metal tube has a flexible section with cuts through the wall of the tube so as to deliberately reduce its bending stiffness such that the tube can flex under the anticipated loads resulting from misalignment. For example, the tube may have a section with a pattern of circumferential slots cut through the tube wall at different axial locations, locally lowering its strength and making it able to bend to accommodate misalignment between the shafts as it rotates.

Such conventional flexible couplings have generally been considered satisfactory for their intended purpose but there is a desire to improve these.

SUMMARY

According to a first aspect, the present disclosure provides a flexible coupling for transmitting torque between parts of a transmission shaft system. The flexible coupling comprises a tubular section of continuous-fibre-reinforced composite material which has been modified to form a living hinge section with reduced bending stiffness to allow flexion of the tubular section.

In addition to or as an alternative to the foregoing, the tubular section may have been modified through the provision of a pattern of formations within the living hinge section. Optionally, the formations are in the form of apertures and/or recesses in the continuous-fibre-reinforced composite material to create a plurality of living hinges in the material between. By way of example, the formations may be in the form of slots and/or grooves in the continuous-fibre-reinforced composite material.

In addition to or as an alternative to the foregoing, the pattern of formations may divide the living hinge section into consecutive flexible and rigid segments. Optionally each flexible segment may comprise necks of material forming a living hinge of the living hinge section. The or each rigid segment may comprise a ring of the tubular section linked on each axial side by a living hinge. The flexible segments may have less continuous-fibre-reinforced composite material per unit axial length compared to the or each rigid segments to reduce bending stiffness locally.

In addition to or as an alternative to the foregoing, the pattern of formations may comprise sets of circumferentially extending formations provided at common axial locations along the tubular section, each set of formations being spaced axially with respect to a next set of formations.

In addition to or as an alternative to the foregoing, each set of formations may comprise two or three circumferentially extending formations provided at a given axial location. The ends of the formations may define neck sections of continuous-fibre-reinforced composite material therebetween. Optionally the pattern of formations may comprise pairs of opposed formations in the continuous-fibre-reinforced composite material separated by pairs of neck sections, each pair of neck sections provided at a different axial position along the tubular section. By way of example, each pair of neck sections may be angularly offset from a next pair of neck sections by 90°.

In addition to or as an alternative to the foregoing, the pattern of formations may define at least three living hinges in the living hinge section, each allowing flexion of the tubular section in a radial direction. Optionally there may be at least five living hinges. By way of example there may be at least eight living hinges.

In addition to or as an alternative to the foregoing, the formations may extend in a helical direction to leave helically extending neck sections of continuous-fibre-reinforced composite material between adjacent sides of the formations. These may provide a living hinge of the living hinge section. Optionally there are at least two sets of helically extending formations and the formations of one set may extend in an opposed helical direction to another set. By way of example, each set of formations may comprise at least three formations having the same helical pitch; optionally at least five formations having the same helical pitch.

In addition to or as an alternative to the foregoing, the formations may extend in an axial direction separated by neck sections of continuous-fibre-reinforced composite material extending axially therebetween. These may provide a living hinge of the living hinge section. Optionally, there are at least two sets of formations, one set extending in an axial direction which is angularly displaced with respect to another set. By way of example, each set of formations may comprise at least three axially extending formations. In some instances each set of formations may comprise at least five axially extending formations.

In addition to or as an alternative to the foregoing, the tubular section may comprise: a first layer of continuous fibres having a first winding angle; and a second layer of continuous fibres having a second winding angle. The first and second winding angles may be different and wherein at least one of the layers of continuous fibres may have been cut through or is absent to provide at least some of the formations.

In addition to or as an alternative to the foregoing, at least some of the formations may have been formed by winding, braiding or laying-up continuous fibres between pegs on a core, the pegs diverting the path of the fibres such that there are no fibre ends at an edge of each formation.

In another embodiment, the present disclosure may be seen to provide a vehicle comprising parts of a transmission shaft system, wherein a first part of the transmission shaft system is connected to a prime mover, such as an engine or motor, and a second part of the transmission shaft system is connected to a component. The vehicle also comprises a flexible coupling in accordance with one of the preceding statements. The flexible coupling is connected between the parts of the transmission shaft system and is configured to transmit torque between the parts and to simultaneously accommodate axial misalignment of the transmission shaft system parts. The vehicle may be an aircraft.

In another embodiment, the present disclosure may be seen to provide a method of forming a flexible coupling suitable for transmitting torque between parts of a transmission shaft system. The flexible coupling has a tubular section comprising continuous-fibre-reinforced composite material. The method comprises modifying the tubular section to provide a living hinge section of reduced bending stiffness which allows flexion of the tubular section.

In addition to or as an alternative to the foregoing, the modifying may comprise forming a pattern of formations within the living hinge section by removing continuous-fibre-reinforced composite material or by deflecting fibre of the continuous-fibre-reinforced composite material during fabrication. Optionally it may comprise creating formations which are in the form of apertures and/or recesses in the continuous-fibre-reinforced composite material, to thereby create a plurality of living hinges in the material between. By way of example, the formations may be formed as slots and/or grooves in the continuous-fibre-reinforced composite material of the living hinge section.

In addition to or as an alternative to the foregoing, the tubular section may be formed by a winding, braiding or lay-up process. If wound, the winding process may comprise winding a first layer of continuous fibres around a core having an axis, the fibres being wound with a first winding angle with respect to the axis and winding a second layer of continuous fibres around the core and the first layer, the second layer of continuous fibres being wound with a second winding angle with respect to the axis, wherein the first winding angle is different from the second winding angle. If braided, the braiding process may comprise braiding a plurality of continuous fibres around a core such that continuous fibres of different winding directions are laid over a region in an alternating manner. If a lay-up process is used then it might comprise depositing woven sheets of continuous fibres around a core. Then in further steps, the tubular section may be subsequently cured, and if a liner is present in the tubular section during the winding/braiding/lay-up process, that liner may be removed.

In addition to or as an alternative to the foregoing, the step of modifying the tubular section may comprise providing one or more pegs extending from the core. The winding/braiding/lay-up process may include passing the fibres around the peg(s) such that, when the peg(s) is/are removed, there is a peg-shaped gap in the respective layer of fibres. Additionally or alternatively the step of modifying the tubular section may comprise cutting a plurality of formations in the tubular section. The formations formed by either route may comprise sets of slots or grooves, to provide a pattern of formations that allows flexion of the tubular section. Optionally the step of modifying the tubular section may comprise keeping some continuous-fibre-reinforced composite material extending over the formations.

According to a further embodiment the present disclosure may be seen to provide a method of flexibly coupling parts of a transmission shaft system to accommodate axial misalignment between the parts. The method comprises connecting the flexible coupling of any of the above statements between the parts.

DESCRIPTION OF THE FIGURES

Certain embodiments of the present disclosure will now be described in greater detail by way of example only and with reference to the accompanying drawings in which.

DETAILED DESCRIPTION

Fibre-reinforced composite materials are formed from fibres, usually a high strength fibre such as carbon fibre, aramid fibre, glass fibre, that are encased in a matrix, usually a cured polymer resin. The polymer resin holds the fibres substantially in place and transmits forces between the fibres.

In generic fibre-reinforced composites, the fibres may be continuous in the matrix, meaning that the length of each fibre is substantially greater than the fibre diameter, or the fibres may be short-fibres or chopped-fibre where each fibre may only be a few millimetres long or less. In continuous-fibre composites, the fibres may be braided into a structure, may be formed of woven sheets of material, or the fibres may be filament wound around an item (e.g. a removable core or a core that remains in situ).

Fibre-reinforced composite materials can have substantially higher strength per unit weight compared to engineering metals. Thus, a flexible coupling made with continuous-fibre-reinforced composite materials may be lighter than a similar shaped metal flexible coupling.

Figure 1:
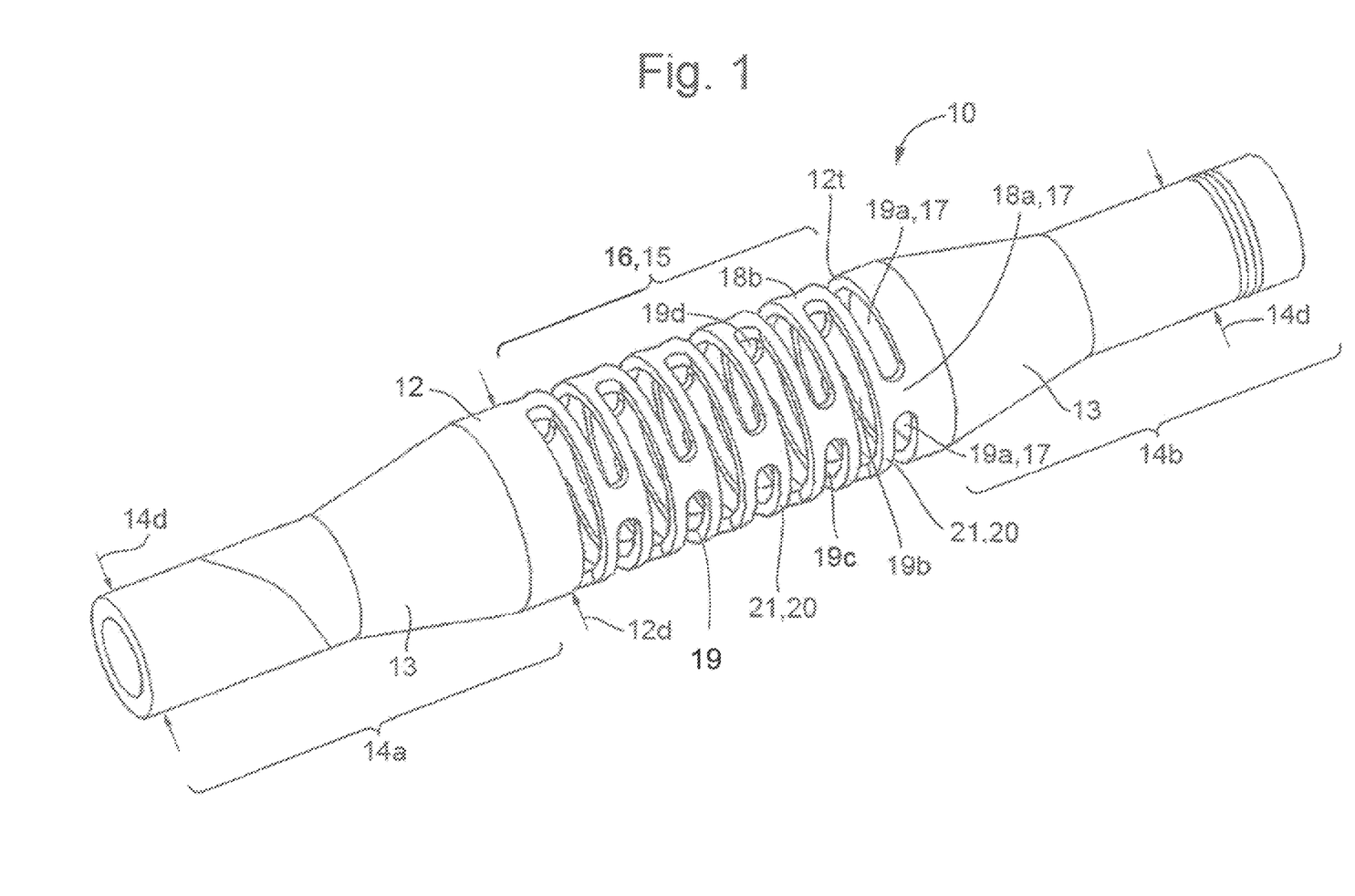
FIG. 1 shows an exemplary flexible coupling having an enlarged diameter.

FIG. 1 shows a flexible coupling 10. The flexible coupling 10 comprises a tubular section 12 having a circumferential wall and being located between two end sections 14a, 14b. The circumferential wall of the tubular section 12 has a wall thickness 12t. The tubular section has an outer diameter 12d. The two end sections 14a,b may connect to other parts (not shown) or may themselves be shafts, e.g. drive shafts, in a transmission shaft system.

The tubular section 12, the end sections 14a, 14b, and/or other parts of the transmission shaft system are made from continuous-fibre-reinforced composite material. They may be made from the same or different continuous-fibre-reinforced composite materials. The fibres may be carbon fibres comprising carbon filaments. The matrix may be a cured epoxy, polyester or other resin material.

According to the present disclosure, the flexible coupling has a tubular section 12 of continuous-fibre-reinforced composite material which has been modified to form a living hinge section 15 with reduced bending stiffness to allow flexion of the tubular section. The tubular section 12 is modified to reduce the volume of continuous-fibre-reinforced composite material in discrete regions of the living hinge section 15. This provides preferential sites where bending can occur to accommodate axial misalignment of the parts.

Thus the living hinge section 15 may be provided by a pattern of formations 16. The formations are discrete regions of the tubular section 12 which have been modified to reduce the volume of continuous-fibre-reinforced composite material locally compared to the surrounding unmodified regions of the tubular section 12. For example, the formations may be in the form of apertures or recesses provided in a circumferential wall of the tubular section 12. These formations may be elongate and take the form of slots 19, e.g., rounded slots, or grooves 89 (see e.g. FIG. 7A), e.g., grooves with rounded ends. Neck sections of continuous-fibre-reinforced composite material between the formations may then provide a series of living hinges, which together make up the living hinge section of the flexible coupling 10.

While the tubular section is shown in FIG. 1 as being of a cylindrical form, the tubular section 12 need not be of constant diameter 12*d*. For example, the diameter 12*d* may be larger towards the middle of the tubular section 12.

In addition, the thickness 12*t* of the tubular section 12 need not be of constant wall thickness. For example, the thickness 12*t* may decrease towards the middle of the tubular section 12 or may increase locally around the periphery of the formations.

A transmission shaft system may include one or more drive shafts, screw shafts, connections, couplings etc. for the purpose of transmitting torque from one part (e.g. from a motor or engine) to another part (e.g. a wheel, an actuator, a converter, a generator, a rotary wing etc.). A transmission shaft system may form part of an aircraft.

The two cylindrical portions of the end sections 14*a,b* have an outer diameter 14*d*. In the example shown in FIG. 1, the diameters 14*d* of the end sections are substantially the same and are smaller than the diameter 12*d* of the tubular section. In the example shown in FIG. 1, the tubular section 12 is connected to cylindrical portions of the end sections 14*a,b* by frustoconical portions 13. For each frustoconical portion 13, the larger diameter of the frustocone is the same as the diameter of the tubular section 12*d* and the smaller diameter of the frustocone is the same as the diameter 14*d* of the cylindrical portions of the end portions 14*a,b*. That is, each frustocone joins the tubular section 12 to a cylindrical portion of an end section 14*a,b*.

Figure 3:
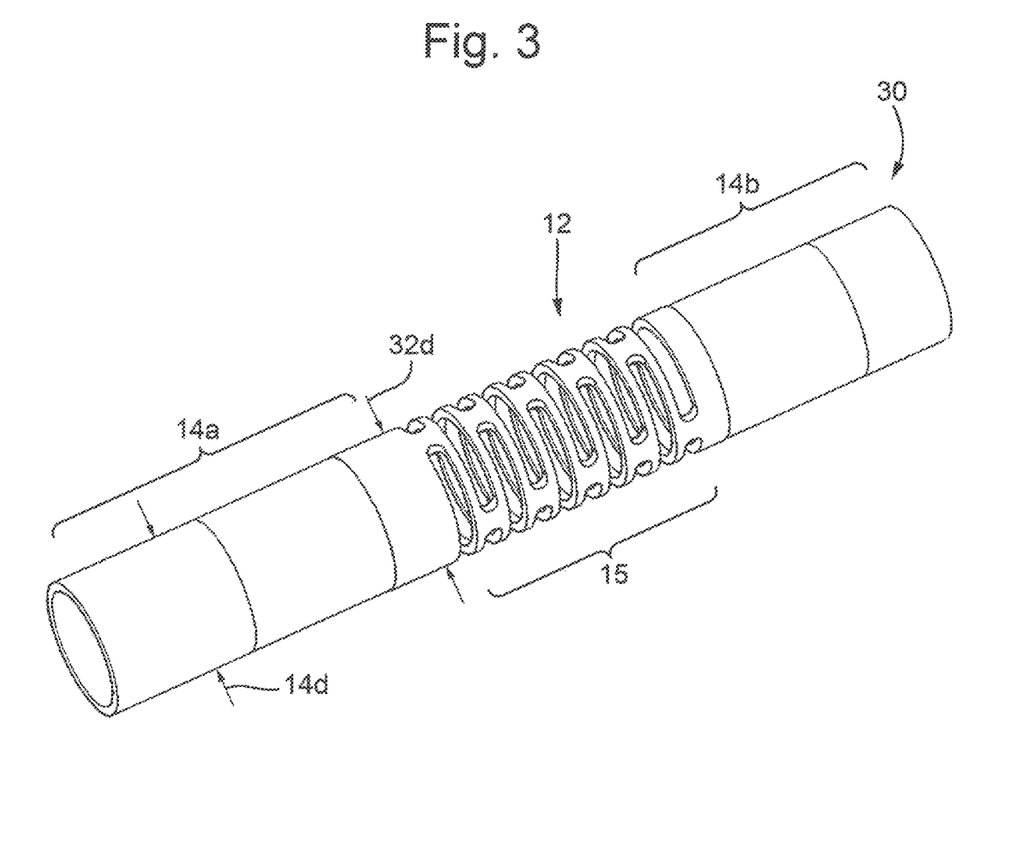
FIG. 3 shows an exemplary flexible coupling without an enlarged diameter.
Figure 4:
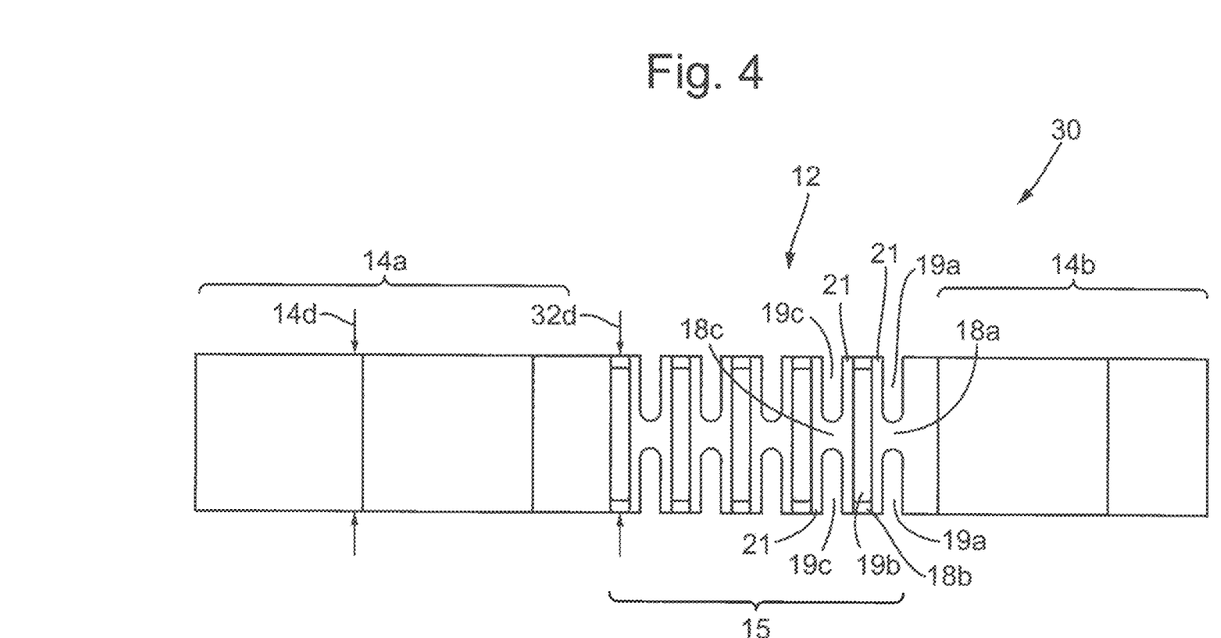
FIG. 4 shows a plan view of the flexible coupling of FIG. 3.

In other examples, such as those shown in FIGS. 3 and 4, the diameter 14*d* of the end sections 14*a,b* may be the same as the diameter 32*d* of the tubular section 12. In these embodiments, there are no frustoconical portions 13.

The first 14*a* and second 14*b* ends may each form (be formed integrally with) a shaft such that the flexible coupling 10 allows for axial misalignment between the two ends of the shaft. Put another way, two shaft sections may be formed from the same continuous fibre-reinforced composite material and the flexible coupling may be simultaneously formed between the shaft sections to provide a unitary shaft made from continuous-fibre-reinforced composite material incorporating the flexible coupling 10.

Alternatively, one or both end sections 14*a,b* may be configured to connect to a drive shaft (not shown) such that the flexible coupling 10 allows for axial misalignment between parts of a transmission shaft system. This connection may be by a splined connection, a pinned connection, a flanged connection, a glued connection, or any other connection known to the skilled person.

The tubular section 12 has a living hinge section 15 provided by a pattern of formations 16 formed in the circumferential wall. The formations are regions where the continuous-fibre-reinforced composite material has been removed or is absent, and may take the form of apertures 19 or recesses 89, more usually having an elongated shape.

The pattern of formations 16 provides a living hinge section 15 to reduce bending stiffness in order to allow flexion of the tubular section 12.

In the example shown in FIG. 1, the pattern of formations 16 is a plurality of circumferentially extending slots or elongated apertures 19 that extend through the thickness 12*t* of the circumferential wall of the tubular section 12. The formations 19,89 may be arranged parallel to one another when the tubular section 12 is in an unflexed, natural state. The apertures may extend for 90 degrees or more around the circumference of the tubular section 12. That is, the apertures 19 may subtend an angle of 90 degrees or more (less than 180 degrees) around the circumference of the tubular section 12. In examples, the apertures 19 may subtend angles of at least 120, 140 or 150 degrees around the circumference of the tubular section 12, but probably less than 160 or 170 degrees, and generally less than 175 degrees around the circumference of the tubular section 12.

Figure 7A:
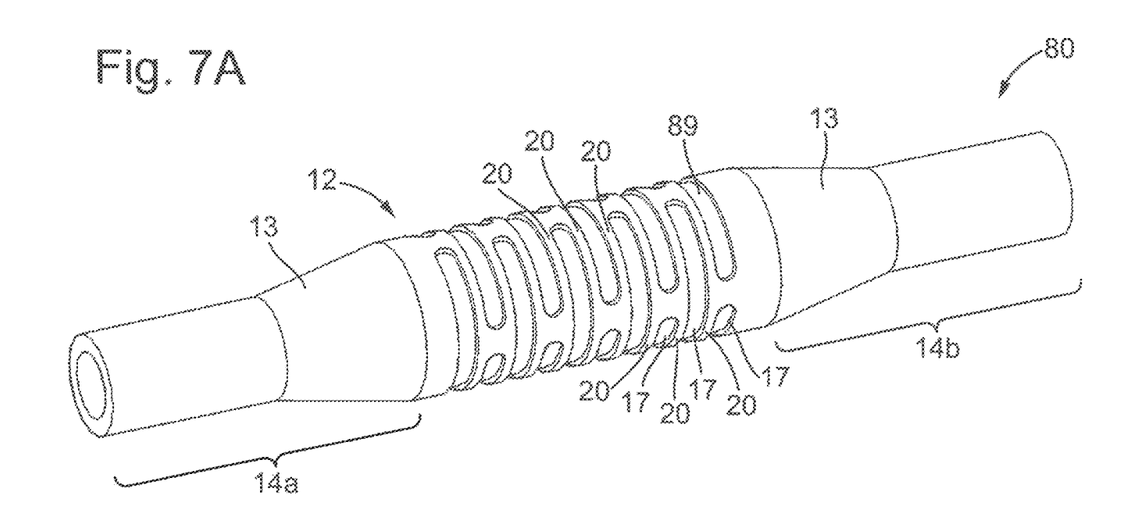
FIG. 7A shows an exemplary flexible coupling having grooves that do not extend through the whole tube wall thickness.
Figure 7B:
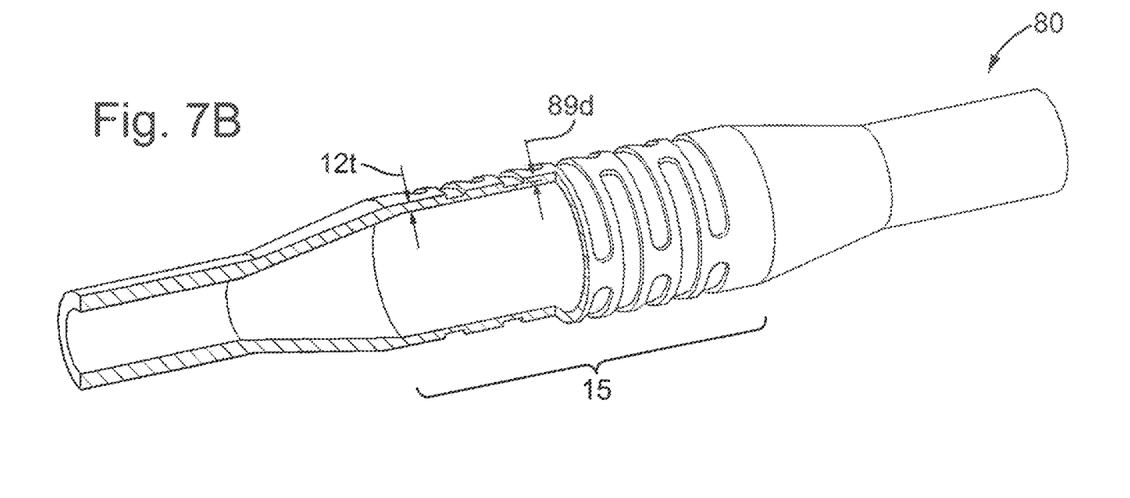
FIG. 7B shows the example of FIG. 7A with a section cut away.

In other examples, such as those shown in FIGS. 7A and 7B, the formations 89 do not extend through the entire wall thickness 12*t* of the tubular section 12. That is, the formations may be in the form of recesses 89, for example, troughs or grooves, in the surface of the tubular section 12. These grooves 89 form regions of reduced thickness of the circumferential wall and thus provide deliberate weakening of the wall to introduce the required flexibility of the flexible coupling 10. Such grooves 89 can be advantageous where it is desired to keep the interior of the tubular section 12 sealed. The base of the grooves 89 may be provided either by a region of the continuous-fibre-reinforced composite material that has not been cut away or otherwise removed, or by a liner or other layer of material present in the tubular section 12.

The following discussion of the locations and arrangement of apertures 19 applies equally to grooves 89, and accordingly these terms can be used interchangeably. In addition, there may be situations where it is desirable to use a mixture of apertures 19 and grooves 89, e.g. to benefit from certain mechanical or performance characteristics.

The ends of a pair of slot-shaped apertures 19*a* located at a common axial position along the tubular section 12 define a first pair of neck sections 18*a*. The neck sections 18*a* are remaining portions of the circumferential wall. That is, the neck sections 18*a* are still joined to/integral with the rest of the continuous-fibre-reinforced composite material of the flexible coupling 10. The neck sections 18*a* may be diametrically opposite one another across the diameter 12*d* of the tubular section 12.

The first pair of neck sections 18*a* may define a living hinge for bending in a first direction. That is, the first pair of neck sections 18*a* and first pair of apertures 19*a* may together provide a flexible segment 17 of the tubular section 12.

The ends of a second pair of slot-shaped apertures 19*b* located at a common axial position spaced further along the tubular section, and situated next in line to the first pair of circumferential apertures 19*a*, define a second pair of neck sections 18*b* which are remaining portions of the circumferential wall. The second pair of neck sections 18*b* may be diametrically opposite one another across the diameter 12*d* of the tubular section 12.

The second pair of neck sections 18*b* may define a living hinge bending in a second direction that may be the same as or, more usually, will be different to the first direction, for example, rotated through 90 degrees compared to the living hinge provided by the first pair of neck sections 18*a*. That is, the second pair of neck sections 18*b* may provide another flexible segment 17 of the tubular section 12.

Located axially between the two pairs of neck sections 18*a*, 18*b*, there may be a complete ring 21 of circumferential wall of the tubular section 12. The ring 21 provides a rigid segment 20 inbetween the two flexible segments 17 formed by the neck sections 18*a*,18*b*.

In the embodiment shown, the ring 21 is a circumferentially extending band of continuous-fibre-reinforced composite material. It is also possible for the slot-shaped apertures 19 (or grooves 89) to have more rounded or diamond shaped outlines than the stadium or slot-shapes shown. In these arrangements the ring 21 may follow a more zig-zag path around the tubular section 12 between the apertures 19.

In the example shown in FIG. 1, the adjacent pairs of neck sections 18*a,b* are angularly offset from each other by 90 degrees. That is, a first neck section of the first pair of neck sections 18*a* is at a first angular position around the circumference of the tubular section 12, and a first neck section of the second pair of neck sections 18*b* is at a second angular position around the circumference of the tubular section 12, and the first and second angular positions are 90 degrees apart.

As a result of the angular offset, the living hinge formed by the first pair of neck sections 18*a* may bend in a first direction, while the living hinge formed by the second pair of neck sections 18*b* may bend in a second direction that is perpendicular to the first direction. Thus, the flexible coupling 10 is able to bend in both the first and second directions and at any angle in-between the first and second directions.

There may be subsequent pairs of apertures 19*c*, 19*d* etc. at different common axial locations along the tubular section 12, each spaced axially from the next. In the example shown in FIG. 1, there are ten pairs of apertures 19 which make up the living hinge section 15.

Through the provision of such an alternating sequence of living hinge axes within the living hinge section 15, the flexible coupling is able to accommodate limited axial misalignment in a shaft transmission system and may even have sufficient flexibility within a limited range of angular displacement, for example, up to ±10 or ±15 degrees, to be useable in place of a universal joint coupling.

As shown in FIG. 1, ends of each pair of apertures 19*c* and 19*d*, like the first 19*a* and second 19*b* pairs of apertures, may define respective neck sections 18. The circumferential locations of the neck sections 18 may alternate such that the first, third, fifth etc. pairs of neck sections are at the first angular position, whilst the second, fourth, sixth etc. pairs of neck sections 18 are at the second angular position (i.e. 90 degrees different from the first angular position).

Each adjacent pair of apertures 19 define a complete ring 21 of circumferential wall of the tubular section 12 between them. That is, first apertures 19*a* and second apertures 19*b* define a first ring 21, while second apertures 19*b* and third apertures 19*c* define a second ring 21 axially along from the first ring 21, and so forth along the tubular section 12. The flexible segments 17 together make up a living hinge section 15 of the tubular section 12.

A plurality of rings 21 may thus be defined in the tubular section 12, each ring 21 providing a rigid segment 20 of the flexible coupling 10, and axially adjacent each rigid segment 20 there is a flexible segment 17 provided by the apertures 19 and the neck sections 18 therebetween.

In examples, there may be three slot-shaped apertures 19 or grooves 89 at a common axial position, in which case the ends of these define three neck sections 18. In other examples, there are more than three slot-shaped apertures 19 or grooves 89, defining more than three neck sections 18.

In some examples there are three rigid segments 20 linked by two flexible segments 17. In other examples, there are five rigid segments 20 linked by four flexible segments 17. In other examples, there are eight rigid segments 20 linked by seven flexible segments 17.

Of course, the skilled person will recognise that any number of rigid/flexible segments 20,17 may be provided in the flexible coupling 10, according to the desired performance characteristics of the flexible coupling 10 in its intended use.

The flexible coupling 10 is configured to accommodate axial misalignment between parts of a transmission shaft system. In some examples, the flexible coupling 10 may be configured to allow misalignment of at least 3 degrees between the two parts, while transmitting torque between the parts. In other examples, the flexible coupling 10 may be configured to allow up to 7 degrees, up to 11 degrees, or up to 15 degrees misalignment, while transmitting torque between the parts.

The amount of misalignment may be determined by varying the size, shape, orientation, and number of the formations. Increasing the amount of misalignment the flexible coupling 10 can accommodate may have a trade-off in the maximum torque the flexible coupling 10 can accommodate.

The flexible coupling 10 may be part of an aircraft shaft transmission system. In some examples, it may be configured to transmit a normal running torque between two shaft transmission system parts of, say, around 30 Nm and have an ultimate torque of around 300 Nm. The tubular section of the flexible coupling 10 may have a minimum outer diameter of 2 cm and may be 5 cm or more.

The apertures 19 may be cut into the circumferential wall after forming of the tubular section 12, for example with an angle grinder, a milling device, or laser cutter. Alternatively the tubular section 12 may be originally formed with the apertures 19 (or recesses 89) therein. That is, there is no step of cutting with e.g. an angle grinder, a milling device, or laser cutter.

A method by which the apertures or recesses 19,89 may be formed without cutting is described below with reference to FIG. 8.

The flexible coupling 10 comprises continuous-fibre-reinforced composite material. In embodiments, the flexible coupling is entirely made from continuous-fibre-reinforced composite material. In other embodiments, the flexible coupling is primarily made from continuous-fibre-reinforced composite material but may have some parts made from e.g. metal or plastic, such as provided by a liner that remains part of the flexible coupling 10 after production. The liner may offer some additional properties like electrical or thermal conduction, surface properties etc. to the flexible coupling 10.

In examples, at least 75% of the material volume of the flexible coupling 10 consists of continuous-fibre-reinforced composite. In other examples, at least 90% of the material volume of the flexible coupling consists of continuous-fibrereinforced composite. The remaining fraction of the flexible coupling 10 may for example be metal fasteners, liners, coatings, or sensors, or other non-fibre-reinforced items the skilled person may wish to incorporate as part of the flexible coupling 10.

The fibres are "continuous" through the body of the flexible coupling 10 in the sense that they (and the component filaments) are generally either continuous along the entire length of the tubular body of the flexible coupling 10 or they are substantially continuous along it (i.e. allowing for cutting of the fibres at the apertures 19 or other terminations or breaks that may be present in the product as a result of its manufacture). That is, there may be breaks or cuts in the continuous-fibres but nonetheless their length is still substantially greater than the diameter.

Figure 2:
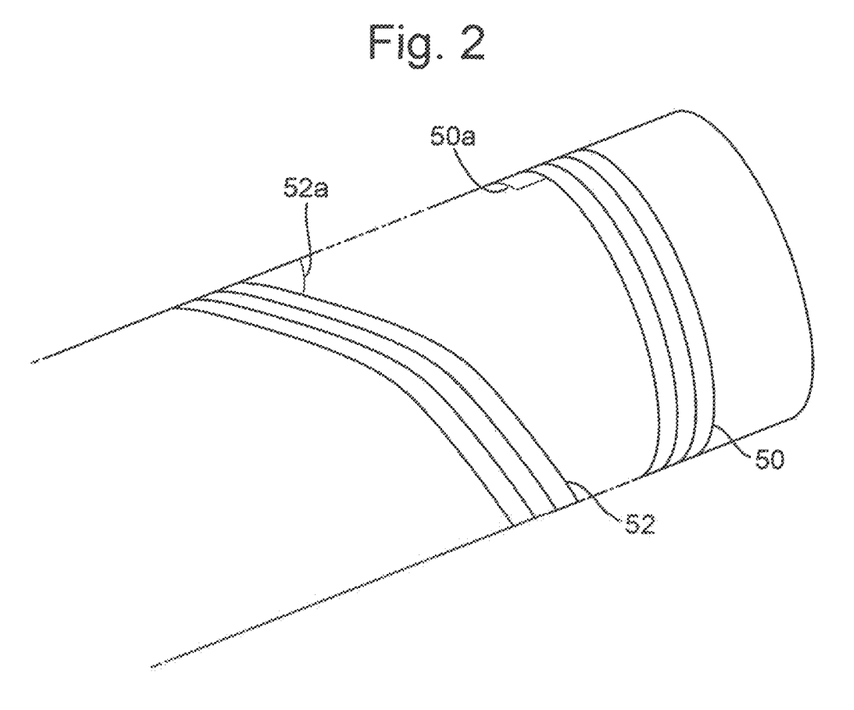
FIG. 2 shows a tube wound with two layers of continuous fibres having different fibre angles.

The flexible coupling 10 may be made from two or more layers of continuous-fibres, as shown in FIG. 2. In these examples, a first layer 50 may be formed from a continuous fibre wound around a core (not visible in FIG. 2) in a helical manner. The first layer 50 may have a first winding angle 50a defined relative to a center axis of the flexible coupling 10. In some embodiments, the first winding angle 50a may be substantially 90 degrees. That is, the helical angle is as close to 90 degrees as is allowed by the fibre thickness in order to provide a series of close packed hoops.

Winding the first layer 50 in this fashion can give good hoop strength to the flexible coupling 10.

The second layer 52 may be formed from continuous fibre wound on top of the first layer 50. The second layer 50 may be wound with a second winding angle 52a. That is, the second layer may have a second winding angle 52a relative to a center axis of the flexible coupling 10. The first 50a and second 52a winding angles may be different angles.

In some examples, the winding angle 52a of the second layer 52 may be from 30 degrees to 60 degrees.

Winding the second layer 52 in this fashion can give more axial strength to the continuous-fibre-reinforced composite material. The flexible coupling 10 may be made with further layers of wound fibres each having their own winding angles. The winding angles of the further layers may be the same or different from the aforesaid first and second winding angles.

The pattern of formations 16 may be arranged such that the neck sections 18 are positioned such that a fibre of the second layer 52 (and further layers, as available) extends through at least two adjacent neck sections 18 at different axial positions.

The fibres of the flexible coupling 10 may also be braided. Braided fibres contain multiple fibres with different winding angles that are interleaved. The formations in the flexible coupling 10 may be made by cutting through the braided fibres or may be made through braiding the fibres over a former which provides shapes for the braided fibres to pass around.

Alternatively, the fibres of the flexible coupling 10 may be formed as fabrics that are laid up into the desired shape for the flexible coupling 10. The exemplary flexible couplings described below may also be formed with woven sheets of fibres, as desired.

A combination of techniques could be used to lay up the fibres forming the tubular section 12.

FIG. 3 shows another flexible coupling 30 in which the tubular section 12 has the same diameter 32d as the end sections 14a,b. That is, there are no frustoconical sections 13 in this flexible coupling 30.

FIG. 4 shows a plan view of the flexible coupling 30 of FIG. 3. This view shows the rings 21, the neck sections 18a,b,c that connect the rings 21 together, and the apertures 19a,b,c that separate the rings 21.

Figure 5:
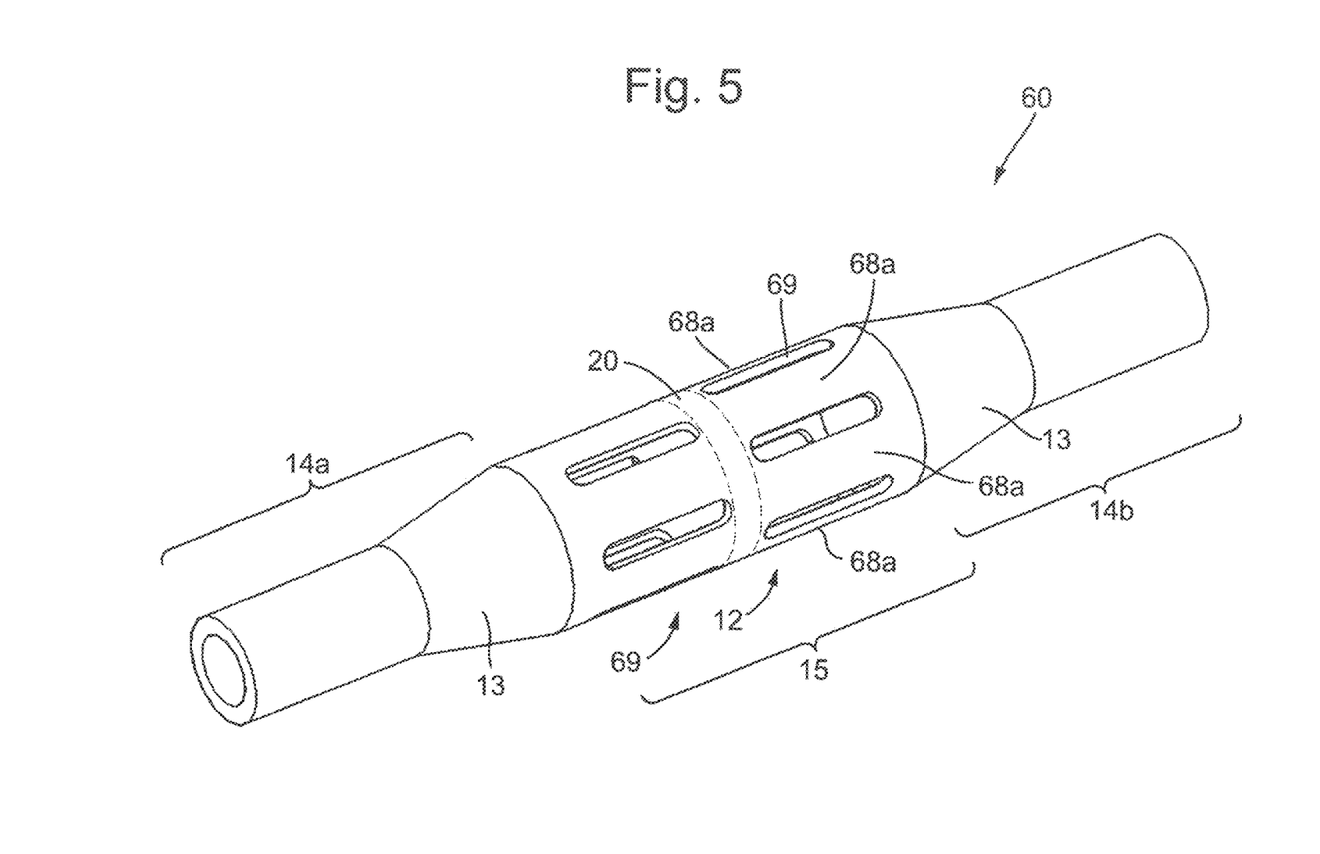
FIG. 5 shows an exemplary flexible coupling having axially oriented apertures.

FIG. 5 shows another flexible coupling 60 in which the formations are axially extending apertures 69 (rounded slots). In this example, a single rigid segment 20 (the ring indicated by dotted lines) is disposed between two sets of apertures 69. In this example, there are more than two apertures 69 at a common axial position for defining each flexible segment 17. Consequently, there are more than two neck sections 68a that join the flexible segment 17 to the rigid segment 20 of the tubular section 12. The apertures 69 (or grooves) are arranged into two sets either side of a ring of the continuous-fibre-reinforced composite material positioned in the middle of the living hinge section 16. The apertures 69 of one set are angularly displaced with respect to the other set, such that the apertures 69 are seen to alternate in position as the living hinge section is viewed in a circumferential direction.

Figure 6:
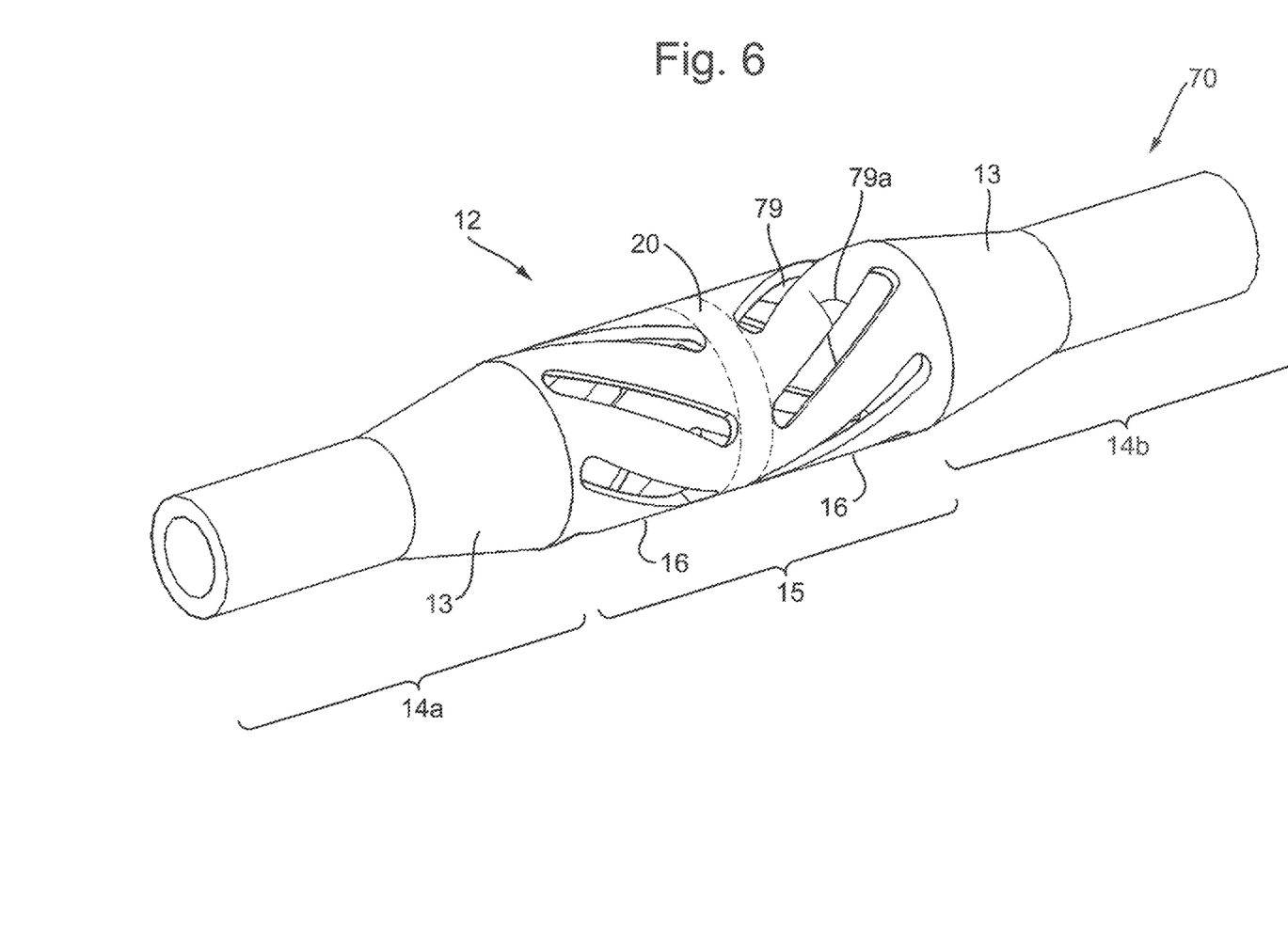
FIG. 6 shows an exemplary flexible coupling having helically extending apertures.

FIG. 6 shows another flexible coupling 70 in which the apertures 79 extend helically around the circumference of the tubular section 12. The apertures 79 may have a helical angle 79a. In such examples having helical apertures 79 (or helical grooves), the windings of one of the layers of fibres may have the same or similar winding angle to the helical angle 79a of the apertures (or grooves), for example, plus or minus up to about 5 or even 10 degrees depending on the width of the neck section and the length of the aperture. In this example, a single rigid segment 20 (the ring indicated by dotted lines) is disposed between two sets of apertures 79 and the rigid parts at the end of the flexible coupling 70 provide further rigid segments 20 of continuous-fibre-reinforced composite material.

In the example shown in FIG. 6, there are two flexible segments 17 formed by the helical apertures 79 separated by a rigid segment 20 (e.g., a ring of material as shown by the dotted lines). The rigid parts at the ends of the flexible coupling 70 provide two further rigid segments 20 which sandwich the living hinge. The apertures 79 (or grooves) of one set extend in an opposed helical direction to the other set.

FIG. 7a shows another flexible coupling 80 in which the formations are grooves 89. A plurality of rigid segments 20 are formed between the grooves 89.

As shown in the cutaway in FIG. 7b, the grooves 89 do not extend through the entire thickness 12t of the tubular section 12. Instead, the grooves 89 have a depth 89d measured from an outer circumferential surface of the tubular section 12 and the depth 89d is less than the thickness 12t of the tubular section 12.

All of the embodiments shown with apertures 19,59,69,79 may be formed with grooves instead of apertures. Grooves may provide benefits for example, for keeping debris and contaminants out of the flexible coupling.

The grooves 89 may be formed by cutting through one or more layers of fibres but leaving one or more layers intact where the flexible coupling is made from a plurality of layers of continuous fibres. They could also be formed by cutting through one or more layers but leaving a liner intact.

Figure 8:
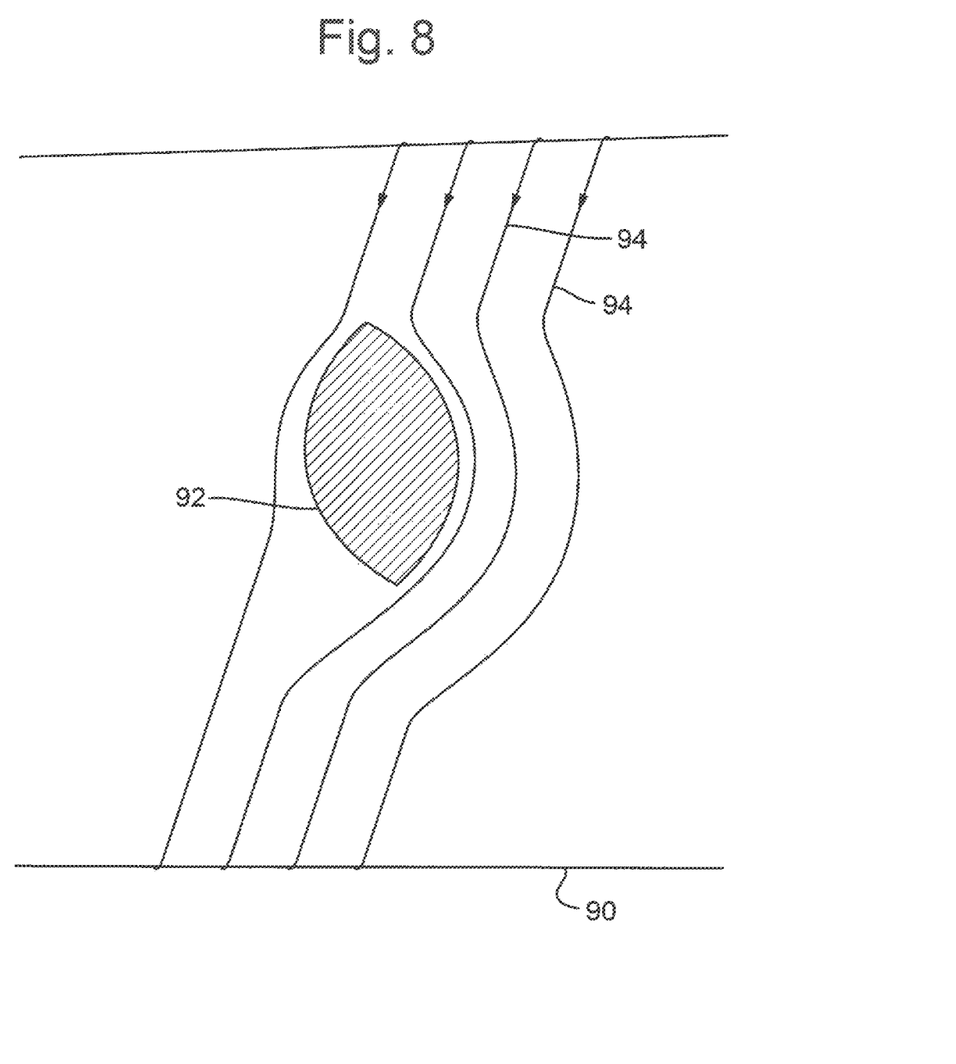
FIG. 8 shows a core having a peg and continuous fibres being diverted by the peg.

FIG. 8 shows an alternative method of making the formations. In the figure, a cylindrical core 90 is provided with a removable peg 92 installed on its outer surface. Of course, other shapes of core or former are envisaged, such as a frustoconical core, a core with a square, rectangular, hexagonal or other polygonal cross-section etc. Multiple pegs 92 may be provided.

A continuous fibre is wound around the core 90. For clarity, most windings of the fibre have been omitted and only a few windings 94 of the fibre are shown. The fibre winds around the core 90 and, when it comes into abutment with a peg 92, the fibre is diverted from its usual winding angle with respect to the core axis and instead follows around the side of the peg 92. Once the fibre is no longer in abutment with the peg 92, it resumes being wound at the original winding angle. When the fibre encounters another peg 92, the same process may repeat.

Multiple pegs 92 may be placed at the same axial position along the core 90 so as to define neck regions 18 therebetween.

When the winding (or braiding) of all layers of fibres is completed (and optionally, after curing of the resin of the continuous-fibre-reinforced composite material), the pegs 92 are removed from the core 90 and the core 90 may be removed from within the flexible coupling 10 (or prepreg of the flexible coupling 10, if uncured). The core may be a meltable core, e.g. formed of a wax or thermoplastic, such that it can be melted out of the flexible coupling once the flexible coupling 10 is completed, or it may be some other material which can be broken down or dissolved to allow its removal. Conceivably, the core 90 and any such pegs 92 could be made instead of a comparatively flexible material and remain in place when the flexible coupling 10 is placed into service.

In a flexible coupling 10 made in this fashion, there is no cutting of the fibres at the edges of the formations (i.e. apertures or grooves), as the path of the fibres is diverted around the formations by the pegs 92.

The pegs 92 may be short enough to affect only one or a few layers of the fibres (e.g. an innermost layer in contact with the core) while subsequent layer(s) lie over the top of the pegs 92 such that these later layers are not diverted by the pegs 92.

The pegs 92 may have any cross-sectional shape so as to define a corresponding shape of the formation in the flexible coupling 10. For example, the pegs 92 may have circular cross-section, or elliptical, or sharpened oval, or stadium-shaped, as desired.

The formations, either as apertures 19,59,69,79 or grooves 89, cause the tubular wall to have less material per unit length at those regions, compared to the rigid segments provided by the rings 21.

In the case of arrangements like FIG. 1, the neck sections 18 may extend more than 5°, more than 10°, and up to 50° around the circumferential wall in a circumferential direction. In examples, the neck sections 18 may extend between 10° and 50°.

In some examples, the ends 14a,b comprise sections of a single drive shaft with the flexible coupling 10,30,60,70,80 formed between the sections. In other examples, one or both ends 14a,b are configured to connect to a part of a transmission shaft system. This allows the flexible coupling 10,30,60,70,80 to transmit torque while allowing for axial misalignment between the parts.

Figure 9:
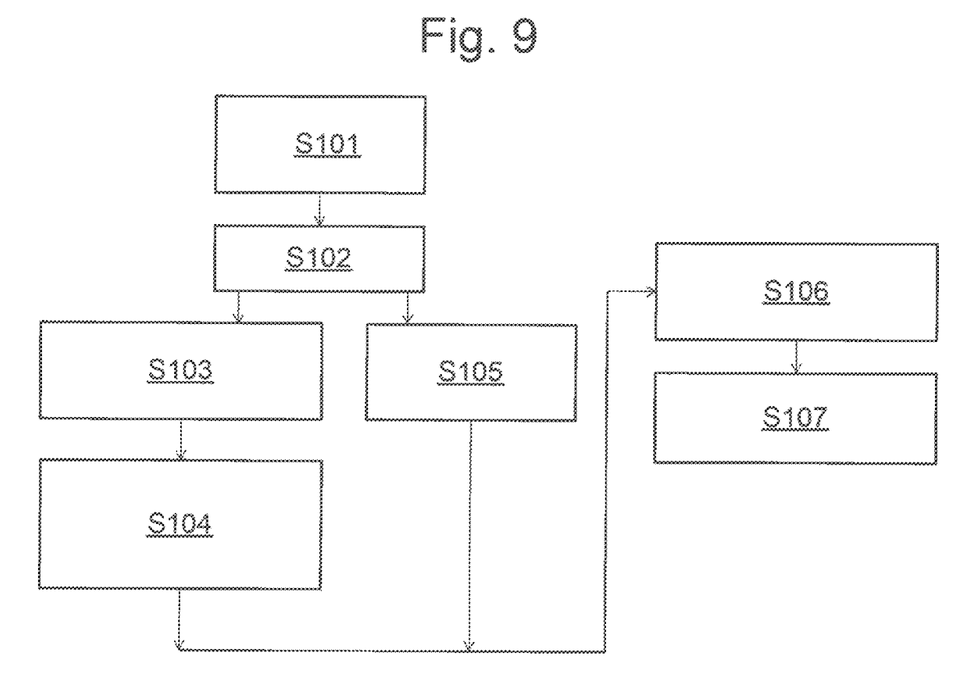
FIG. 9 shows a flow diagram of one exemplary method of forming a flexible coupling comprising continuous-fibre-reinforced composite material.

FIG. 9 shows a flow diagram of a method of making a flexible coupling 10,30,60,70,80. This method involves the following steps:

Step 101: Provide a core (or liner)

Step 102: Add pegs to the core/liner; and either

Step 103: (1st branch) Wind a first layer of continuous fibre around the core and pegs Step 104: ($1^{st}$ branch) Wind a second and any subsequent layer(s) of continuous fibres over the first layer; or Step 105: ($2^{nd}$ branch) Braid continuous fibres around the core or lay down woven sheets of continuous fibres; then Step 106: Cure into a continuous-fibre-reinforced composite flexible coupling; and Optional Step 107: Remove the core/liner and pegs.

Figure 10:
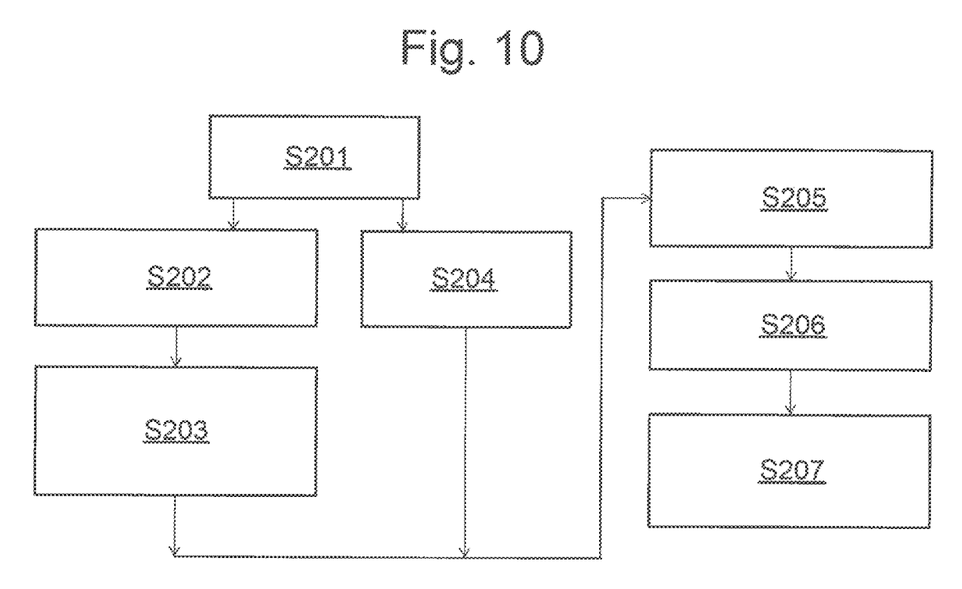
FIG. 10 shows a flow diagram of another exemplary method of forming a flexible coupling comprising continuous-fibre-reinforced composite material.

FIG. 10 shows another method of making a flexible coupling 10,30,60,70,80. This method involves the steps:

Step 201: Provide a core (or liner); and either

Step 202: ($1^{st}$ branch) Wind a first layer of continuous-fibre around the core/liner.

Step 203: ($1^{st}$ branch) Wind a second and any subsequent layer(s) of continuous-fibres over the first layer; or Step 204: ($2^{nd}$ branch) Braid continuous fibres around the core or lay down woven sheets of continuous fibres; then Step 205: Cure into a continuous-fibre-reinforced composite flexible coupling;

Step 206: Remove the core/liner; and

Step 207: Form the pattern of formations in the flexible coupling, e.g. by cutting.

The invention claimed is:

1. A flexible coupling for transmitting torque between parts of a transmission shaft system, comprising:
a tubular section of continuous-fibre-reinforced composite material which has been modified to form a living hinge section with reduced bending stiffness to allow flexion of the tubular section, wherein the tubular section is located between and connected to two end sections and wherein:
a first of the end sections comprises a first cylindrical portion that is connected via a frustoconical portion to a first end of the tubular section;
a second of the end sections comprises a second cylindrical portion that is connected via a frustoconical portion to a second, opposite, end of the tubular section;
the tubular section has a larger diameter than each of the first and second cylindrical portions; and
the tubular section is formed of a continuous-fibre-reinforced composite material.

2. A flexible coupling according to claim 1, wherein the tubular section has been modified through the provision of a pattern of formations within the living hinge section, preferably wherein the formations are in the form of apertures and/or recesses in the continuous-fibre-reinforced composite material to create a plurality of living hinges in the material between, and preferably wherein the formations are in the form of slots and/or grooves in the continuous-fibre-reinforced composite material.

3. A flexible coupling according to claim 2, wherein the pattern of formations divides the living hinge section into consecutive flexible and rigid segments, preferably wherein each flexible segment comprises necks of material forming a living hinge of the living hinge section, and the or each rigid segment comprises a ring of the tubular section linked on each axial side by a living hinge, such that the flexible segments have less continuous-fibre-reinforced composite material per unit axial length compared to the or each rigid segments to reduce bending stiffness locally.

4. A flexible coupling according to claim 2, wherein the pattern of formations comprises sets of circumferentially extending formations provided at common axial locations along the tubular section, each set of formations being spaced axially with respect to a next set of formations.

5. A flexible coupling according to claim 4, wherein each set of formations comprises two or three circumferentially extending formations provided at a given axial location, such that ends of the formations define neck sections of continuous-fibre-reinforced composite material therebetween, and preferably wherein the pattern of formations comprises pairs of opposed formations in the continuous-fibre-reinforced composite material separated by pairs of neck sections, each pair of neck sections provided at a different axial position along the tubular section, and preferably each pair of neck sections is angularly offset from a next pair of neck sections by 90°.

6. A flexible coupling according to claim 2, wherein the pattern of formations defines at least three living hinges in the living hinge section, each allowing flexion of the tubular section in a radial direction; preferably where there are at least five living hinges; more preferably at least eight living hinges.

7. A flexible coupling according to claim 2, wherein the formations extend in a helical direction to leave helically extending neck sections of continuous-fibre-reinforced composite material between adjacent sides of the formations to provide a living hinge of the living hinge section;
  preferably wherein there are at least two sets of helically extending formations and the formations of one set extend in an opposed helical direction to another set; and
  preferably wherein each set of formations comprises at least three formations having the same helical pitch or preferably at least five formations having the same helical pitch.

8. A flexible coupling according to claim 2, wherein the formations extend in an axial direction separated by neck sections of continuous-fibre-reinforced composite material extending axially therebetween to provide a living hinge of the living hinge section;
  preferably wherein there are at least two sets of formations, one set extending in an axial direction which is angularly displaced with respect to another set;
  and preferably wherein each set of formations comprises at least three axially extending formations, or preferably at least five axially extending formations.

9. A flexible coupling according to claim 2, wherein the tubular section comprises:
  a first layer of continuous fibres having a first winding angle; and
  a second layer of continuous fibres having a second winding angle, wherein the first and second winding angles are different and wherein at least one of the layers of continuous fibres has been cut through or is absent to provide at least some of the formations, and/or
  wherein at least some of the formations have been formed by winding, braiding or laying-up continuous fibres between pegs on a core, said pegs diverting the path of the fibres such that there are no fibre ends at an edge of each formation.

\* \* \* \* \*